(12) United States Patent
Lambersend

(10) Patent No.: US 9,742,210 B2
(45) Date of Patent: Aug. 22, 2017

(54) SELF-POWERED REMOTE CONTROL DEVICE

(71) Applicant: SOMFY SAS, Cluses (FR)

(72) Inventor: Bruno Lambersend, Bonneville (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 15/102,922

(22) PCT Filed: Dec. 16, 2014

(86) PCT No.: PCT/EP2014/078052
§ 371 (c)(1),
(2) Date: Jun. 9, 2016

(87) PCT Pub. No.: WO2015/091542
PCT Pub. Date: Jun. 25, 2015

(65) Prior Publication Data
US 2016/0315493 A1    Oct. 27, 2016

(30) Foreign Application Priority Data

Dec. 16, 2013  (FR) ...................................... 13 62716

(51) Int. Cl.
*H02J 7/00* (2006.01)
*G08C 17/02* (2006.01)
(Continued)

(52) U.S. Cl.
CPC ............ *H02J 7/0068* (2013.01); *G08C 17/02* (2013.01); *H02J 3/383* (2013.01); *H02J 7/025* (2013.01);
(Continued)

(58) Field of Classification Search
None
See application file for complete search history.

(56) References Cited

U.S. PATENT DOCUMENTS

2012/0294056 A1* 11/2012 Temesi ............ H03K 17/08128
363/131

FOREIGN PATENT DOCUMENTS

EP        2 395 625 A2    12/2011
FR        EP 2395625 A2 *  12/2011  ............. G08C 17/00
(Continued)

OTHER PUBLICATIONS

Korean Office Action dated Aug. 10, 2016 in counterpart Korean patent application No. 9-5-2016-057558126; with English machine translation (9 pages).

(Continued)

*Primary Examiner* — Rexford Barnie
*Assistant Examiner* — Swarna N Chowdhuri
(74) *Attorney, Agent, or Firm* — Westerman, Hattori, Daniels & Adrian, LLP

(57) ABSTRACT

Remote control device comprising a generator (PVU) intended to convert light or mechanical energy to electrical energy, a wireless transmitter (RF) able to send messages to a remote receiver, a first electrical energy storage element (C1) connected to the energy generator (PVU) and intended to be charged with the electrical energy generated by the generator (PVU) in order to supply power to the wireless transmitter (RF) in a first operating mode of the control device, and a second electrical energy storage element (C2) intended to supply power to the wireless transmitter (RF) in a second operating mode. The second electrical energy storage element is connected to the generator (PVU) via parallel connection of a first resistor (R1) and a first diode (D1), the cathode of the first diode being connected to the positive terminal of the generator (PVU).

21 Claims, 1 Drawing Sheet

(51) Int. Cl.
  *H02J 3/38*    (2006.01)
  *H02J 7/02*    (2016.01)
  *H02J 7/35*    (2006.01)
  *H04W 4/12*    (2009.01)
  *H02J 7/34*    (2006.01)

(52) U.S. Cl.
  CPC ............... *H02J 7/35* (2013.01); *H04W 4/12* (2013.01); *G08C 2201/112* (2013.01); *G08C 2201/114* (2013.01); *H02J 7/345* (2013.01)

(56) References Cited

FOREIGN PATENT DOCUMENTS

| JP | 9-264971 A | 10/1997 |
|---|---|---|
| KR | 10-2010-0020825 A | 2/2010 |
| KR | 10-2013-0082240 A | 7/2013 |

OTHER PUBLICATIONS

International Preliminary Report on Patentability dated Jun. 21, 2016 adopting the Written Opinion dated Jan. 23, 2015 issued in corresponding application No. PCT/EP2014/078052; w/ English machine translation of IPRP form and English translation of Written Opinion (11 pages).

International Search Report and Written Opinion dated Jan. 23, 2015 issued in corresponding application No. PCT/EP2014/078052; w/ English partial translation and partial machine translation (15 pages).

\* cited by examiner

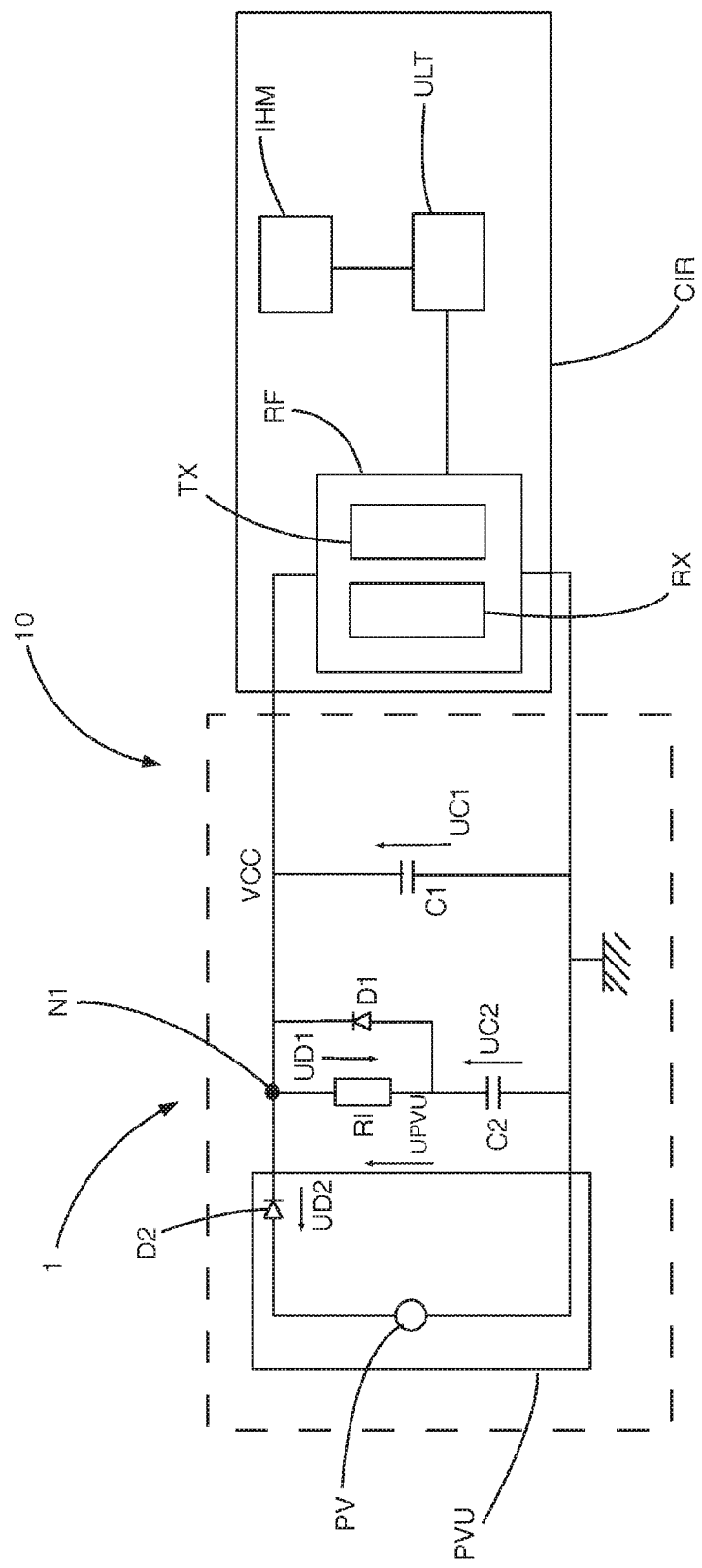

SELF-POWERED REMOTE CONTROL DEVICE

The invention relates to a self-powered remote control device comprising a generator that is intended to convert light or mechanical energy to electrical energy.

Such a device is known from the prior art. For example, an autonomous means for supplying power by converting energy provided by a source to electrical energy is known. The energy source may be, in particular, of electromagnetic type (solar radiation) or of mechanical type (rotation or vibration of a structure as a result of wind or rain). This electrical energy is subsequently stored in a generally physicochemical storage means such as a storage battery, or preferably a supercapacitor, or a simple capacitor.

Such a device comprises means for wirelessly transmitting communication signals via electromagnetic waves, e.g. radio waves. This transmission means allows the device to communicate information to various other devices in a home automation network such as, in particular, actuators, control units and sensors. The device may potentially comprise means for receiving communication signals so as to achieve bidirectional communication between the device and other devices in the network.

One problem posed by this type of device is its use after a long period without exposure of its photovoltaic generator to light radiation or without input of mechanical energy. Specifically, in such a situation, the electrical energy storage means is generally empty and the device is no longer operational.

The energy conversion and storage means are generally dimensioned according to normal usage constraints. If, for example, the device is supplied with power by a photovoltaic panel, the storage means must be suitable for long-term autonomy, so as to allow proper functioning even after a long period without exposure. Typically, a period of complete autonomy of 18 hours is required for such an application. This autonomy requires a high energy storage capacity, and hence a long charging time, during which the device is not operational.

To overcome such a problem, a device comprising two photovoltaic panels with different characteristics, in particular with different powers, is known, each of these panels supplying power to a separate energy storage element. The elements have different storage capacities. Thus, the low capacity element is charged quickly and may hence rapidly supply power to a priority electrical circuit of the device. However, such an architecture is complex and expensive.

The aim of the invention is to provide a remote control device that allows the drawbacks to be overcome and the self-powered devices known from the prior art to be improved. The invention proposes a control device with a simple structure that allows a few communication signals to be transmitted a short time after its exposure to light radiation, even after a long prior period without exposure to light radiation, or after low input of mechanical energy.

According to the invention, the remote control device comprises a generator that is intended to convert light or mechanical energy to electrical energy, a wireless transmitter that is able to send messages to a remote receiver, a first electrical energy storage element that is connected to the energy generator and is intended to be charged with the electrical energy generated by the generator in order to supply power to the wireless transmitter in a first operating mode of the control device, and a second electrical energy storage element that is intended to supply power to the wireless transmitter in a second operating mode. The second electrical energy storage element is connected to the generator via parallel connection of a first resistor and a first diode, the cathode of the first diode being connected to the positive terminal of the generator.

The maximum storage capacity of the first electrical energy storage element may be n times smaller than the maximum storage capacity of the second electrical energy storage element, where n>100, or even n>1000.

The load current of the first storage element may be at least k times larger than the current flowing in the branch comprising the series assembly formed by the first resistor and the second storage element, where k>2, or even k>10.

The control device may comprise a wireless receiver that is capable of receiving messages.

The second storage element may comprise a supercapacitor and/or a rechargeable battery.

The appended drawing represents, by way of example, one embodiment of a self-powered remote control device according to the invention.

FIG. 1 is a circuit diagram of one embodiment of a device according to the invention.

One preferred embodiment of a remote control device 10 according to the invention is described below with reference to FIG. 1.

The device comprises an autonomous power supply module 1 and an electronic circuit CIR comprising a telecommunication circuit RF. The autonomous power supply module allows the electronic circuit to be supplied with electrical power.

The telecommunication circuit comprises a telecommunication signal transmitter TX and, potentially, a telecommunication signal receiver RX. The transmitter is preferably a wireless transmitter, in particular an electromagnetic signal transmitter, in particular a radiofrequency signal transmitter. The transmitter allows control commands and/or messages and/or information to be transmitted to devices located in proximity, in particular to devices that are part of the same network, in particular of the same home automation network. The receiver is preferably a wireless receiver, in particular an electromagnetic signal receiver, in particular a radiofrequency signal receiver. The receiver allows control commands and/or messages and/or information to be received from devices located in proximity, in particular from devices that are part of the same network, in particular of the same home automation network.

The electronic circuit CIR also comprises a human-machine interface IHM. This comprises an input element, in particular a keyboard or at least a control button and, potentially, a signalling element, in particular a screen or at least an indicator light. The human-machine interface may comprise a touchscreen. The electronic circuit also comprises a logical processing unit ULT such as a microprocessor or microcontroller.

The autonomous power supply module comprises a generator PVU that is intended to convert light energy to electrical energy, a first electrical energy storage element C1 and a second electrical energy storage element C2. The generator PVU may comprise a generator element PV and a diode D2 whose function is to prevent the possibility of the first and the second storage elements being discharged through the generator. Alternatively, this diode may be present as a discrete component. In particular, this diode may be provided at the level of the positive terminal of the generator. It may also be provided at the level of the negative terminal of the generator. In the rest of this document, "generator PVU" denotes a generator integrating such a diode D2.

Alternatively, the generator element PV may be of inductive charging (or "wireless charging") type, intended to convert electromagnetic energy to electrical energy.

The first electrical energy storage element C1 is connected to the energy generator PVU and is intended to be charged with the electrical energy generated by the generator in order to supply power to at least the transmitter TX of the telecommunication element in a first operating mode of the control device, referred to as short-term operating mode.

The second electrical energy storage element C2 is intended to supply power to the transmitter TX in a second operating mode, referred to as long-term operating mode. This storage element may be a supercapacitor, i.e. a capacitor using particular technology allowing power and energy densities to be obtained that are intermediate between those of cells or batteries and those of conventional electrolytic capacitors to be obtained. This type of component therefore allows a quantity of energy to be stored that is intermediate between those of battery and capacitor storage technologies to be stored and to restore it more quickly than with a battery or cell.

Alternatively, the second storage element may be a battery.

The second electrical energy storage element C2 is connected to the generator PVU via parallel connection of a first resistor R1 and a first diode D1. The cathode of the first diode is connected to the positive terminal of the generator.

The generator may be a photovoltaic panel such as a panel of silicon photovoltaic cells. The generator is, for example, capable of generating a current of 20 μA to 100 μA under a voltage of 3 to 5 V and light radiation of 200 lux. The voltage delivered by the generator may be adjusted by modifying the number of photovoltaic cells according to the requirements of the application. The current may be adjusted by modifying the surface area of the photovoltaic cells.

The first energy storage element C1 and the second energy storage element C2 have different capacities, in particular their values may differ in a ratio of 100, or even 1000. These differences in capacity imply substantial differences in charging time under a current of the same intensity.

The first energy storage element C1 is, for example, a capacitor. Its capacitance is typically between 50 μF and 2 mF. For example, its capacitance may have a value of 220 μF. The first storage element is, for example, charged to a voltage of 3 V to 5 V. The role of the first storage element C1 is to quickly store electrical energy under sufficient voltage to allow it to be used by the electronic circuit, in particular by the emitter Tx of the telecommunication circuit. Preferably, the energy stored in the first storage element and that can be used by the circuit must be sufficient to allow the transmitter to transmit a few frames, in particular one, two, three or four frames, of a control or information signal. Typically, each frame lasts for around 100 ms and the voltage of the first storage element may be brought back down to around 2 V after the transmission of these few frames.

The second energy storage element C2 is, for example, a supercapacitor. Its capacitance is typically between 1 mF and 2 F. For example, its capacitance may have a value of 330 mF.

Due to the presence of the resistor R1, the voltage across the terminals of the second storage element remains substantially unchanged over the time taken to charge the first storage element. In particular, it remains substantially zero if it was zero beforehand.

Specifically, the current delivered by the generator PVU is divided, in the node N1, between the load current of the first storage element C1 and the current flowing in the branch formed by the resistor R1 that is in parallel to the diode D1. During the charging phase, as the diode D1 is in the "off" state, the current is consequently divided between the resistor R1 and the load element C1. Due to the presence of this resistor R1 in the first branch comprising the second energy storage element C2, the current will preferentially flow through the branch comprising the first energy storage element C1 and hence will charge the latter in preference or as a priority.

The choice of the value of the resistor R1 depends on the current provided by the generator PVU, on the value chosen for the first storage element C1 and on the desired time taken for the latter to reach the charged state, i.e. the time required to allow short-term operation.

Thus, according to known methods for analysing the transient regime, the current required for charging the first storage element C1 within a predetermined time may be calculated. As explained, the current delivered by the generator PVU is divided between the two branches that respectively comprise the first load element C1 and the resistor R1. The current flowing through the resistor R1 is therefore the difference between the current delivered by the generator PVU and the load current of the first load element C1. Knowing the voltage across the terminals of the generator PVU, the resistance value of the resistor R1 may be determined. This value is typically of the order of 10 kΩ, or even of the order of 100 kΩ.

In one preferred embodiment, the load current of the first storage element C1 is at least k times larger than the current flowing in the branch comprising the series assembly formed by the first resistor R1 and the second storage element C2, where k>2, or even k>10. These are the mean values of the currents in the branches in question. The mean values are calculated for the complete charging period of the first storage element C1 from its completely discharged state.

When the energy of the second storage element C2 is used to supply power to the circuit CIR and, in particular, the transmitter TX, the diode D1 is in the "on" state, introducing a low resistance path connected in parallel to the resistor R1 and thereby creating a bypass around this resistor R1 for the current delivered by the second storage element C2.

In one embodiment, a second storage element of 330 mF may make it possible to ensure an autonomous supply of power to the circuit CIR for five days, assuming nominal consumption.

It is noted that such a power supply structure is very simple and hence very reliable. In particular, the various components are permanently connected to one another without a controlled switch and hence without a circuit for controlling such a controlled switch. The charging logic of the storage elements is directly determined by the ratio of the load currents. The switchings of the diode D1 make it possible to automatically use the first or the second storage element.

One operating mode of one embodiment of a remote control device is described below.

In a first state, it is assumed that the control device is placed in the dark and that the first and second storage elements are discharged. In this situation, the intensity of the current delivered by the generator is zero. The voltages across the terminals of the first and second storage elements are zero.

In a second state, it is assumed that the device is exposed to light radiation. The generator therefore produces an electric current of intensity i which will mainly charge the first storage element C1 and very slightly charge the second storage element C2 owing to the presence of the resistor R1. A fast charging of the first storage element C1 follows, along with a slow charging of the second storage element C2. The aim of the invention is achieved as the fast charging of the first storage element C1 will quickly allow the electronic circuit to be supplied with power and, in particular, a few frames to be transmitted as shown above. In this second state, we have UC1=UC2+i×R1, hence UC1>UC2.

In a third state, it is assumed that the electronic circuit is supplied with power in order to send a few frames using the transmitter. The energy is therefore drawn off at the level of the first storage element. The voltage of the first storage element thus quickly goes from around 4 V to around 2 V. During this phase, it is assumed that the first storage element must provide a current of around 10 to 15 mA for 100 ms. The device is in the first, short-term, operating mode.

In a fourth state, it is assumed that the device continues to be exposed to light radiation and that the storage elements continue to be charged, the second storage element C2 taking much more time to charge than the first storage element C1.

In a fifth state, it is assumed that the device has reached a steady state. This state is the "long-term" operating state, in which the circuit CIR is supplied with power by the second storage element C2. As the diode D1 is in the "on" state, the biasing voltage directly across its terminals is UD1.

We have UC1=UC2+UD1, consequently UC2=UC1−UD1 and hence the voltage across the terminals of the second storage element, UC2, is lower than the voltage across the terminals of the first storage element, UC1. Thus, the current delivered by the second serves solely to supply power to the electronic circuit CIR and cannot serve to charge the first storage element.

For example, in this state, even in the absence of illumination, around 150 frames may be transmitted by the transmitter. The device is in the second operating mode.

The control device according to the invention allows the device to be extremely quickly placed in operational condition. The description pertains to a device whose source of energy is light. However, the photovoltaic unit PVU described may be replaced by any transducer that is capable of transforming non-electrical energy into electrical energy, such as, for example, an electromagnetic microgenerator driven by an anemometer wheel or a piezoelectric element that converts the vibrations of the structure on which it is mounted to electricity.

In the case in which the first or second elements are capacitors as described above, the storage capacity of the elements is understood to be their capacitance expressed in farads.

The first and second elements may also consist of storage batteries. In this case, the storage capacity of the elements is understood to be their charge expressed in amp-hours.

One of the elements may consist of a capacitor and the other may consist of a storage battery. In this case, the storage capacity of the elements is understood to be the energies stored in these elements while the device is in operation.

As previously mentioned, the remote control device comprises a transmitter TX for transmitting telecommunication signals, in particular an electromagnetic signal transmitter, in particular a radiofrequency signal transmitter. The transmitter allows control commands and/or messages and/or information to be transmitted to devices located in proximity, in particular to devices that are part of the same network, in particular of the same home automation network. Consequently, the control device may be of various kinds. In particular, it may be a sensor or a radio beacon.

In one preferred embodiment, the control device is a device transmitting control commands bound for other devices that are part of the same network.

The invention may also be applied to any remote control device comprising a display, in particular a display using electronic paper, or "e-paper", or "e-ink" technology. Such a display allows information, in particular surrounding parameters, relating to the devices that are part of the same home automation network to be presented to a user with a view to remote-controlling these devices by the user.

The invention claimed is:

1. Remote control device comprising:
 a generator configured to convert light or mechanical energy to electrical energy,
 a wireless transmitter capable of sending messages to a remote receiver,
 a first electrical energy storage element connected to the energy generator and so as to be charged with the electrical energy generated by the generator and connected to the wireless transmitter so as to supply power to the wireless transmitter in a first operating mode of the control device, and
 a second electrical energy storage element connected to the wireless transmitter so as to supply power to the wireless transmitter in a second operating mode,
 wherein the second electrical energy storage element is connected to the generator via parallel connection of a first resistor and a first diode, a cathode of the first diode being connected to the positive terminal of the generator,
 so that current from the generator flows preferentially toward the first electrical energy storage element and charges preferentially the first electrical energy storage element.

2. Control device according to claim 1, wherein a maximum storage capacity of the first electrical energy storage element is n times smaller than a maximum storage capacity of the second electrical energy storage element, where n>100.

3. Control device according to claim 1, wherein a load current of the first storage element is at least k times larger than a current flowing in a branch comprising a series assembly formed by the first resistor and the second storage element, where k>2.

4. Control device according to claim 1, comprising a wireless receiver capable of receiving messages.

5. Control device according to claim 1, wherein the second storage element comprises at least one of a supercapacitor and a rechargeable battery.

6. Control device according to claim 1, wherein a maximum storage capacity of the first electrical energy storage element is n times smaller than a maximum storage capacity of the second electrical energy storage element, where n>1000.

7. Control device according to claim 2, wherein a load current of the first storage element is at least k times larger than a current flowing in a branch comprising a series assembly formed by the first resistor and the second storage element, where k>2.

8. Control device according to claim 6, wherein a load current of the first storage element is at least k times larger than a current flowing in a branch comprising a series assembly formed by the first resistor and the second storage element, where k>2.

9. Control device according to claim 1, wherein a load current of the first storage element is at least k times larger than a current flowing in a branch comprising a series assembly formed by the first resistor and the second storage element, where k>10.

10. Control device according to claim 2, wherein a load current of the first storage element is at least k times larger than a current flowing in a branch comprising a series assembly formed by the first resistor and the second storage element, where k>10.

11. Control device according to claim 6, wherein a load current of the first storage element is at least k times larger than a current flowing in a branch comprising a series assembly formed by the first resistor and the second storage element, where k>10.

12. Control device according to claim 2, comprising a wireless receiver capable of receiving messages.

13. Control device according to claim 2, wherein the second storage element comprises at least one of a supercapacitor and a rechargeable battery.

14. Control device according to claim 3, comprising a wireless receiver capable of receiving messages.

15. Control device according to claim 3, wherein the second storage element comprises at least one of a supercapacitor and a rechargeable battery.

16. Control device according to claim 4, wherein the second storage element comprises at least one of a supercapacitor and a rechargeable battery.

17. Control device according to claim 6, comprising a wireless receiver capable of receiving messages.

18. Control device according to claim 6, wherein the second storage element comprises at least one of a supercapacitor and a rechargeable battery.

19. Control device according to claim 7, comprising a wireless receiver capable of receiving messages.

20. Control device according to claim 7, wherein the second storage element comprises at least one of a supercapacitor and a rechargeable battery.

21. Control device according to claim 4, wherein
the first electrical energy storage element is connected to the wireless receiver so as to supply power to the wireless receiver in the first operating mode, and
the second electrical energy storage element is connected to the wireless receiver so as to supply power to the wireless receiver in the second operating mode.

* * * * *